US011887749B2

(12) United States Patent
Xie et al.

(10) Patent No.: US 11,887,749 B2
(45) Date of Patent: Jan. 30, 2024

(54) CABLE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Han-Run Xie, Huaian (CN); Lu-Yu Chang, New Taipei (TW); A-Nan Yang, Huaian (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 17/717,607

(22) Filed: Apr. 11, 2022

(65) Prior Publication Data

US 2022/0336122 A1 Oct. 20, 2022

(30) Foreign Application Priority Data

Apr. 15, 2021 (CN) ......................... 202120765165.3

(51) Int. Cl.
*H01B 11/00* (2006.01)
*H01B 1/02* (2006.01)

(52) U.S. Cl.
CPC ........... *H01B 11/002* (2013.01); *H01B 1/023* (2013.01); *H01B 1/026* (2013.01)

(58) Field of Classification Search
None
See application file for complete search history.

(56) References Cited

U.S. PATENT DOCUMENTS

| | | | | | |
|---|---|---|---|---|---|
| 1,904,472 | A * | 4/1933 | Kent | H01B 9/00 | 174/115 |
| 2,258,687 | A * | 10/1941 | Peterson | H01B 9/04 | 57/3 |
| 3,829,603 | A * | 8/1974 | Hansen | H01B 9/025 | 174/115 |
| 4,454,379 | A | 6/1984 | Cleveland et al. | | |
| 4,481,379 | A | 11/1984 | Bolick, Jr. et al. | | |
| 5,171,938 | A * | 12/1992 | Katsumata | H01B 11/1091 | 174/117 FF |
| 5,416,269 | A * | 5/1995 | Kemp | H01B 7/186 | 174/115 |
| 5,922,996 | A * | 7/1999 | Ryeczek | G01K 11/12 | 116/207 |
| 8,440,910 | B2 | 5/2013 | Nonen et al. | | |
| 8,981,216 | B2 | 3/2015 | Grant et al. | | |
| 9,117,571 | B2 * | 8/2015 | Ulfig | H01B 11/10 | |
| 10,204,717 | B2 | 2/2019 | Tsujino et al. | | |
| 10,354,780 | B2 | 7/2019 | Smith et al. | | |
| 10,366,811 | B2 | 7/2019 | Kobayashi | | |
| 10,950,369 | B1 | 3/2021 | Farkas et al. | | |

(Continued)

*Primary Examiner* — Krystal Robinson
(74) *Attorney, Agent, or Firm* — Ming Chieh Chang

(57) ABSTRACT

A cable includes: a pair of core wires; a shielding layer covering the pair of core wires; an insulating outer layer covering the shielding layer; a ground wire between the pair of core wires and the shielding layer; and a filler wire between the pair of core wires and the shielding layer, and the filler wire is arranged symmetrically with the ground wire.

9 Claims, 1 Drawing Sheet

(56) References Cited

U.S. PATENT DOCUMENTS

| | | | | |
|---|---|---|---|---|
| 2003/0205402 | A1* | 11/2003 | Koyasu | H01B 11/04<br>174/113 C |
| 2006/0054334 | A1 | 3/2006 | Vaupotic | |
| 2016/0036112 | A1 | 2/2016 | Sugiyama et al. | |
| 2016/0302334 | A1 | 10/2016 | Wang et al. | |
| 2017/0302010 | A1* | 10/2017 | Urashita | H01R 13/6581 |
| 2018/0047479 | A1 | 2/2018 | Hansen et al. | |
| 2018/0075948 | A1 | 3/2018 | Kobayashi | |
| 2018/0268965 | A1 | 9/2018 | Dettmer et al. | |
| 2021/0098157 | A1 | 4/2021 | Cai et al. | |
| 2021/0098158 | A1 | 4/2021 | Zheng et al. | |

* cited by examiner

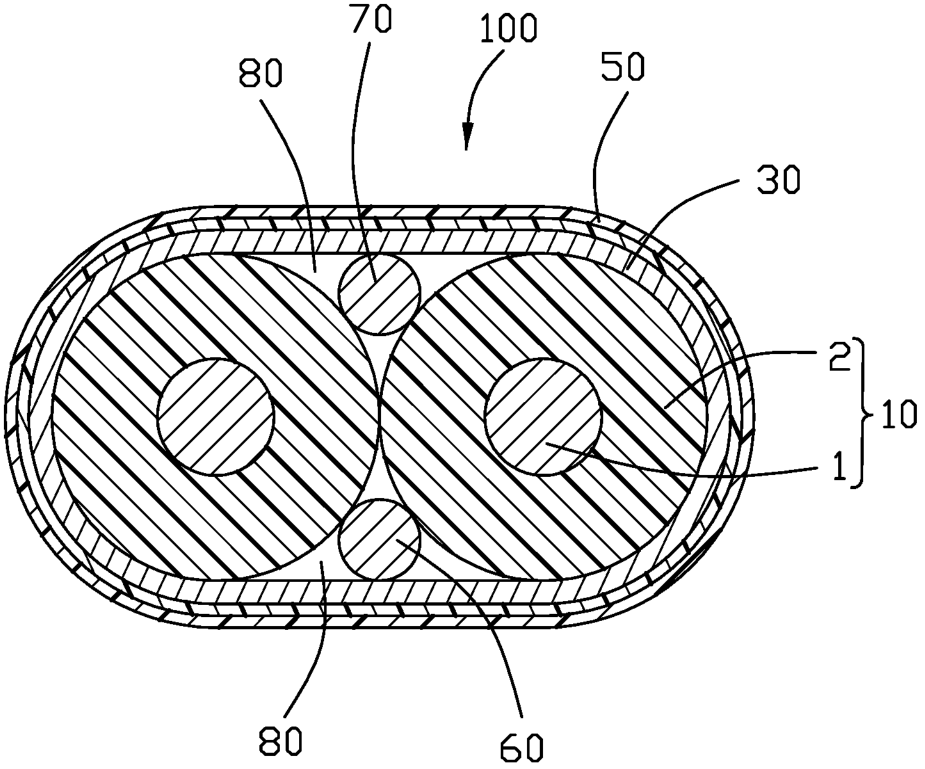
70
100
80
50
30
2
10
1
80
60

CABLE

BACKGROUND OF THE INVENTION

1. Field of the Invention

The present invention relates generally to a cable, and more particularly to a cable with stable structure and low cost.

2. Description of Related Arts

With the development and popularization of electronic technology products, cables are widely used in household appliances, instrumentation, automation equipment, data centers, servers, switches, cloud computing and 5G as a tool for signal transmission. However, in the signal transmission process, the cable is very susceptible to interference from external electromagnetic signals, so it is often necessary to use a structural design of shielding layer and ground wire to eliminate or reduce the interference of the external electromagnetic field, and to prevent the leakage of the transmission signal. In the traditional design, the structure of one ground wire and a shielding layer is often used, which causes the cable structure to be unstable. However, the use of two ground wires makes the structure of the cable stable, but it will increase the cost.

U.S. Pat. No. 10,354,780 discloses a gas blocking cable including two wires twisted with a drain wire and a filler to provide the cable with a round profile. The drain wire is, for example, a 16 AWG tin plated copper wire. The filler is preferably extruded silicone or FEP monofilament. The twisted wires, drain wire, and filler are wrapped with a shield so that they are circumferentially surrounded. The shield may be, for example, Aluminum/Mylar tape. The spaces or areas between the twisted wires, drain wire, and filler are filled with a silicone compound. A jacket is extruded over the shield and may be, for example, extruded FEP (Fluorinated Ethylene Propylene).

SUMMARY OF THE INVENTION

A main object of the present invention is to provide a cable which has stable structure and is cheap.

To achieve the above-mentioned object, a cable comprises: a pair of core wires; a shielding layer covering the pair of core wires; an insulating outer layer covering the shielding layer; a ground wire between the pair of core wires and the shielding layer; and a filler wire between the pair of core wires and the shielding layer, and the filler wire is arranged symmetrically with the ground wire.

Compared to prior art, the present invention has the advantage that the filler wire and the ground wire are arranged symmetrically, so that the structure of the cable is stable and the cost of the cable is low.

BRIEF DESCRIPTION OF THE DRAWING

FIG. 1 is a cross-sectional view of the cable of the present invention.

DETAILED DESCRIPTION OF THE PREFERRED EMBODIMENT

Referring to FIG. 1, which is the cable 100 of the present invention. The cable 100 includes a pair of core wires 10, a shielding layer 30 covering the pair of core wire 10, an insulating outer layer 50 covering the shielding layer 30, a ground wire 60 between the pair of core wires 10 and the shielding layer 30, and a filler wire 70 between the pair of core wires 10 and the shielding layer 30, and the filler wire 70 arranged symmetrically with the ground wire 60.

The pair of core wires 10 are contact with each other and extend in the longitudinal direction. Each of the core wire 10 includes an inner conductor 1 and an insulating layer 2 covering the inner conductor 1. The inner conductor 1 is used for transmitting high-speed signal. The insulating layer 2 of each core wire 10 is extruded and molded to cover the inner conductor 1. The inner conductor 1 is selected from the group including pure copper conductors, silver-plated copper conductors or tin-plated copper conductors. The insulating layer 2 is selected from the group consisting of PP (polypropylene), PE (polyethylene), FEP (Fluorinated ethylene propylene), foamed PP, foamed PE, foamed FEP, and PTFE (polytetrafluoroethylene). The shielding layer 30 is selected from the hot-adhesive aluminum foil, pure aluminum foil, double-sided aluminum foil, hot-adhesive copper foil, pure copper foil, and the double-sided copper foil. The shielding layer 30 covers the pair of core wires 10 in a longitudinal wrapping manner or in a spiral winding manner. A pair of air gaps 80 formed on the upper and lower sides between the shield layer 30 and the pair of core wires 10. The ground wire 60 and the filler wire 70 are respectively located in each of the air gap 80. The ground wire 60 and the filler wire 70 are located symmetrically in the air gaps 80 on different sides. The filler wire 70 is selected from the metal conductor, solid PP, solid PE, hollow PP and hollow PE. The ground wire 60 and the filler wire 70 have the same cross-sectional size to ensure that the structure of the cable is symmetrical and stable. The insulating outer layer 50 is a wrapping tape made of hot-adhesive PET (polyethylene terephthalate). The insulating outer layer 50 covers the shielding layer 30 in a spiral winding manner. The insulating outer layer 50 can be one layer or multiple layers, the adjacent layers of the insulating outer layer 50 are wrapped in different directions, which can offset the stress from each other, thereby making the structure of the cable more stable.

The cable of the present invention, The filler wire 70 is arranged symmetrically with the ground wire 60, so that the cable structure is symmetrical and stable, and the bending effect of the cable has also been improved. The cable 100 is not easily deformed and damaged during the bending process due to the unstable structure of the cable. In addition, the ground wires and the filler wires are respectively arranged in the air gaps 80 on the upper and lower sides. Compared with two ground wires, the cost of the cable filler wire 70 of the present invention is lower than that of the ground wires, and the weight is smaller, which makes the cable more lightweight and has a price advantage.

The above is only one of the embodiments of the present invention, but not all of the embodiments. Any equivalent changes to the technical solutions of the present invention by those skilled in the art by reading the description of the present invention are covered by the claims of the present invention.

What is claimed is:

1. A flat cable comprising:

a pair of core wires;

a shielding layer covering the pair of core wires;

an insulating outer layer covering the shielding layer;

a ground wire between the pair of core wires and the shielding layer; and a filler wire between the pair of core wires and the shielding layer, the filler wire being arranged symmetrically with the ground wire; wherein a pair of air gaps are formed on the upper and lower sides between the shield layer and the pair of core wires, and the ground wire and the filler wire are respectively located in the pair of air gaps and in contact with the shielding layer.

2. The flat cable as claimed in claim 1, wherein the filler wire is selected from the group consisting of metal conductor, solid PP, solid PE, hollow PP, and hollow PE.

3. The flat cable as claimed in claim 1, wherein the ground wire and the filler wire have the same cross-sectional dimension.

4. The flat cable as claimed in claim 1, wherein each of the core wires includes an inner conductor and an insulating layer covering the inner conductor.

5. The flat cable as claimed in claim 4, wherein the insulating layer is selected from the group consisting of PP, PE, FEP, foamed PP, foamed PE, foamed FEP, and PTFE.

6. The flat cable as claimed in claim 4, wherein the inner conductor is selected from the group consisting of pure copper conductors, silver-plated copper conductors, and tin-plated copper conductors.

7. The flat cable as claimed in claim 1, wherein the shielding layer is selected from the group consisting of hot-adhesive aluminum foil, pure aluminum foil, double-sided aluminum foil, hot-adhesive copper foil, pure copper foil, and double-sided copper foil.

8. The flat cable as claimed in claim 1, wherein the shielding layer covers the pair of core wires in a longitudinal wrapping manner or in a spiral winding manner.

9. The flat cable as claimed in claim 1, wherein the insulating outer layer is a wrapping tape made of hot-adhesive PET, and the insulating outer layer covers the shielding layer in a spiral winding manner.

* * * * *